United States Patent
Yoshiura et al.

(10) Patent No.: US 7,801,357 B2
(45) Date of Patent: Sep. 21, 2010

(54) IMAGE PROCESSING DEVICE, IMAGE PROCESSING METHOD, PROGRAM FOR THE SAME, AND COMPUTER READABLE RECORDING MEDIUM RECORDED WITH PROGRAM

(75) Inventors: Takeshi Yoshiura, Ayabe (JP); Yutaka Kato, Fukuchiyama (JP)

(73) Assignee: Omron Corporation, Kyoto (JP)

( * ) Notice: Subject to any disclaimer, the term of this patent is extended or adjusted under 35 U.S.C. 154(b) by 994 days.

(21) Appl. No.: 11/590,923

(22) Filed: Nov. 1, 2006

(65) Prior Publication Data
US 2007/0103482 A1    May 10, 2007

(30) Foreign Application Priority Data
Nov. 2, 2005    (JP) ............................. 2005-319747

(51) Int. Cl.
*G06K 9/00*    (2006.01)
(52) U.S. Cl. ...................... 382/167; 382/100; 382/162

(58) Field of Classification Search ................. 382/100, 382/162, 167; 348/E7.06, 460; 701/207; 345/473, 589; 235/468; 375/240.14
See application file for complete search history.

(56) References Cited

FOREIGN PATENT DOCUMENTS
JP    07-203476    8/1995

OTHER PUBLICATIONS
"Image Processing (Image Processing Standard Textbook)," Computer Graphic Arts Society, p. 260, Feb. 25, 1997.

*Primary Examiner*—Anh Hong Do
(74) *Attorney, Agent, or Firm*—Foley & Lardner, LLP

(57) ABSTRACT

A determination target region includes a combination of a red gray image, a green gray image, and a blue gray image. A CPU part transforms a three gray value matrixes to a single first data array uniquely associated with a pixel position in the determination target region. The CPU part calculates a normalized correlation value with a single second data array transformed from a model image according to the same predetermined rule, and determines whether or not a match is found with the model image according to whether or not the normalized correlation value exceeds a predetermined threshold value.

22 Claims, 10 Drawing Sheets

Fig. 4

| | 1 | 2 | 3 | | N |
|---|---|---|---|---|---|
| 1 | X(1,1) | X(2,1) | X(3,1) | | X(N,1) |
| 2 | X(1,2) | X(2,2) | X(3,2) | | X(N,2) |
| 3 | X(1,3) | X(2,3) | X(3,3) | | X(N,3) |
| | | | | | |
| M | X(1,M) | X(2,M) | X(3,M) | | X(N,M) |

↙ 40

| | 1 | 2 | 3 | | N |
|---|---|---|---|---|---|
| 1 | Y(1,1) | Y(2,1) | Y(3,1) | | Y(N,1) |
| 2 | Y(1,2) | Y(2,2) | Y(3,2) | | Y(N,2) |
| 3 | Y(1,3) | Y(2,3) | Y(3,3) | | Y(N,3) |
| | | | | | |
| M | Y(1,M) | Y(2,M) | X(3,M) | | Y(N,M) |

↙ 44

Normalized correlation value C = 0.5

IMAGE PROCESSING DEVICE, IMAGE PROCESSING METHOD, PROGRAM FOR THE SAME, AND COMPUTER READABLE RECORDING MEDIUM RECORDED WITH PROGRAM

This application claims priority from Japanese patent application 2005-319747, filed on Nov. 2, 2005. The entire content of the aforementioned application is incorporated herein by reference

BACKGROUND OF THE INVENTION

1. Field of the Invention

The present invention relates to an image processing device, an image processing method, a program of the same, and a computer readable recording medium recorded with the program for specifying a region in an input image based on a correlation value with a model image, in particular, to calculation of the correlation value in a color image.

2. Description of the Related Art

Automation has been carried out in manufacturing premises from a viewpoint of saving energy and enhancing efficiency. Various sensor types using light, electricity, electric wave, sound wave and the like are used to realize automation. Among the sensor types, an image processing device for performing defect determination of a product and production management of the product by photographing the products and half finished products, and processing the photographed image is effective. A detecting function similar to the detection by vision of human can be realized with the image processing device, and thus an application range thereof is wide.

Such an image processing device executes processes (hereinafter collectively referred to as pattern search process) such as determination of whether or not a region having a predetermined color or pattern is present in an input image, detection of the number of regions present in the input image, and detection of a position and orientation (rotation angle) of the region present in the input image. Such a pattern search process is achieved by calculating the normalized correlation value of the model image acting as a reference and a region having the same size as the model image out of the input image obtained by photographing the object, as disclosed in "Image processing (Image Processing Standard Text book)", Computer Graphic Arts Society, p. 260, Feb. 25, 1997.

With advancement in recent information technique, a pattern search process employing the color image has been realized in place of a conventional gray image (gray scale image). In the general color image, the colors are defined with gray values of "red", "green" and "blue" based on the three primary colors of light. In other words, the gray image is defined by a one-dimensional gray value, whereas the color image is defined by a three-dimensional gray value.

A method of calculating a color difference in a scalar between each component of the gray value of a reference color registered in advance and each component of the gray value in each pixel of a target color image, and executing the pattern search process based on the color difference is proposed, as disclosed in Japanese Laid-Open Patent Publication No. 7-203476.

SUMMARY OF THE INVENTION

The color difference disclosed in Japanese Laid-Open Patent Publication No. 7-203476 is indicated as a spatial distance from the reference color in a color space including three axes corresponding to each of "red", "green", and "blue", but a direction from the reference color is not taken into consideration since the color difference is a scalar. Thus, a high normalized correlation value tends to be calculated if a relative relationship of the color distribution in a certain region of the input image is close to a relative relationship of the color distribution in the model image. In other words, the normalized correlation value tends to take a high value when the certain region in the input image is close to an image obtained by adding an even concentration component to the model image, since the even concentration component that has been added is ignored in the calculation step of the normalized correlation value. By way of example, the high normalized correlation value is calculated between the model image having a pattern including "black" and "green", and the image having a pattern close to the model image and having a pattern including "red" and "yellow" generated by adding an even "red" to "black" and "green".

Therefore, the image in which the relative relationship of the color distribution is close to that of the model image tends to be detected by mistake in the conventional pattern search process using the color difference.

The present invention, in view of solving the above problems, aims to provide an image processing device, an image processing method, a program for the same, and a computer readable recording medium recorded with the program for specifying a region having a high correlation value with the model image at high precision irrespective of the relative relationship of the color distribution in the image.

According to the present invention, the image processing device for specifying the region in the input image based on the correlation value with the model image is proposed. The image processing device according to the present invention includes an input image acquiring means for acquiring the input image made up of a plurality of pixels defined by three color variables in which each color is independent from each other; a determination target region setting means for setting a determination target region having a size equal to the model image acquired in advance with the respect to an entire region or a partial region of the input image acquired in the input image acquiring means; a first data array transformation means for transforming the plurality of predetermined colors of the three color variables defining each pixel contained in the determination target region set in the determination target region setting means to a single first array according to a predetermined rule; and a correlation value calculating means for calculating the correlation value between the first data array transformed in the first data array transformation means, and a single second data array transformed from the plurality of predetermined color variables out of the three color variables defining each pixel configuring the model image according to the predetermined rule.

Preferably, the first and second data arrays are single data arrays transformed from the three color variables according the predetermined rule.

A reference image acquiring means for acquiring a reference image for extracting the model image; a model image acquiring means for extracting an image of the region corresponding to a command from the outside from the reference image acquired in the reference image acquiring means, and acquiring the extracted image as the model image; and a second data array transformation means for transforming the three color variables defining each pixel configuring the model image acquired in the model image acquiring means to the second data array according to the predetermined rule are preferably included.

Preferably, each of the first and second data arrays is a two-dimensional array made up of a plurality elements arranged in a matrix form in association with the position of the pixel; and each of the plurality of elements includes a one-dimensional array of the three color variables defining the pixel associated with the element.

Preferably, each of the first and second arrays includes three two-dimensional arrays arranged in a matrix form with one color variable out of three color variables defining each pixel associated with the position of the pixel in addition to each of the three color variables; and the three two-dimensional arrays are arranged in order along the same direction and configure the single data array.

Preferably, each of the first and second data arrays includes three one-dimensional arrays in which one color variable out of the three color variables defining each pixel is continuously arranged in addition to each of the three color variables; and the three one-dimensional arrays are arranged in order in the same direction and configure the single data array.

Preferably, the determination target region setting means sequentially moves the determination target region in the region of the input image, and repeatedly executes the processes in the first data array transformation means and the correlation value calculating means for every movement of the determination target region. The image processing device further includes a determining means for specifying the determination target region having a high correlation value with the model image based on a comparison between the correlation value calculated for every movement of the determination target region and a predetermined threshold value, and outputting the total number of specified determination target region and/or each position of the specified determination target regions when the movement of the determination target region is completed in the determination target region setting means.

More preferably, the determination target region setting means sequentially moves the determination target region in the region of the input image, and repeatedly executes the processes in the first data array transformation means and the correlation value calculating means for every movement of the determination target region. The image processing device according to the present invention further includes a determining means for extracting the predetermined number of correlation values in order from highest value out of the correlation values calculated for every movement of the determination target region and specifying the determination target region corresponding to the extracted correlation value when the movement of the determination target region is completed in the determination target region setting means, and outputting each position of the specified determination target region.

The three color variables are preferably gray values of red, green, and blue; and the correlation value calculating means calculates a normalized correlation value as the correlation value.

The three color variables are preferably level values representing hue, value, chroma; and each of the first and second data arrays is a single data array transformed from the level value of the hue and chroma without including the level value of brightness according to the predetermined rule.

According to the present invention, the image processing method for specifying the region in the input image based on the correlation value with the model image is proposed. The image processing method according to the present invention includes, an input image acquiring step for acquiring the input image made up of a plurality of pixels defined by three color variables in which each color is independent from each other; a determination target region setting step for setting a determination target region having a size equal to the model image acquired in advance with the respect to an entire region or a partial region of the input image acquired in the input image acquiring step; and a correlation value calculating step for calculating the correlation value between a first data array and a second data array, the plurality of predetermined colors of the three color variables defining each pixel contained in the determination target region set in the determination target region setting step being a single first data array according to the predetermined rule, and the plurality of predetermined color variables out of the three color variables defining each pixel configuring the model image being a single second data array according to the predetermined rule.

Furthermore, according to the present invention, the image processing method for specifying the region in the input image based on the correlation value with the model image is provided; the image processing method including the input image acquiring step for acquiring the input image made up of a plurality of pixels defined by three color variables in which each color is independent from each other; the determination target region setting step for setting the determination target region having a size equal to the model image acquired in advance with the respect to an entire region or a partial region of the input image acquired in the input image acquiring step; a first data array transformation step for transforming the plurality of predetermined colors of the three color variables defining each pixel contained in the determination target region set in the determination target region setting step to the single first array according to the predetermined rule; and the correlation value calculating step for calculating the correlation value between the first data array transformed in the first data array transformation step, and the single second data array transformed from the plurality of predetermined color variables out of the three color variables defining each pixel configuring the model image according to the predetermined rule.

Preferably, the first and second data arrays are single data arrays transformed from the three color variables according the predetermined rule.

A reference image acquiring step for acquiring a reference image for extracting the model image; a model image acquiring step for extracting an image of the region corresponding to a command from the outside from the reference image acquired in the reference image acquiring step, and acquiring the extracted image as the model image; and a second data array transformation step for transforming the three color variables defining each pixel configuring the model image acquired in the model image acquiring step to the second data array according to the predetermined rule are preferably provided.

Preferably, each of the first and second data arrays is a two-dimensional array made up of a plurality elements arranged in a matrix form in association with the position of the pixel; and each of the plurality of elements contains a one-dimensional array of the three color variables defining the pixel associated with the element.

Preferably, each of the first and second arrays includes three two-dimensional arrays arranged in a matrix form with one color variable out of the three color variables defining each pixel associated with the position of the pixel with respect to each of the three color variables; and the three two-dimensional arrays are arranged in order along the same direction and configure a single data array.

Preferably, each of the first and second data arrays includes three one-dimensional arrays in which one color variable out of the three color variables defining each pixel is continuously arranged with respect to each of the three color variables; and the three one-dimensional arrays are arranged in order in the same direction and configure a single data array.

More preferably, the determination target region setting step sequentially moves the determination target region in the region of the input image, and repeatedly executes the processes in the first data array transformation step and the correlation value calculating step for every movement of the determination target region. The image processing method according to the present invention further includes a determining step for specifying the determination target region having a high correlation value with the model image based on a comparison between the correlation value calculated for every movement of the determination target region and a predetermined threshold value, and outputting the total number of specified determination target region and/or each position of the specified determination target region when the movement of the determination target region is completed in the determination target region setting step.

Preferably, the determination target region setting step sequentially moves the determination target region in the region of the input image, and repeatedly executes the processes in the first data array transformation step and the correlation value calculating step for every movement of the determination target region. The image processing method according to the present invention further includes a determining step for extracting the predetermined number of correlation values in order from highest value out of the correlation values calculated for every movement of the determination target region and specifying the determination target region corresponding to the extracted correlation value when the movement of the determination target region is completed in the determination target region setting step, and outputting each position of the specified determination target region.

The three color variables are preferably gray values of red, green, and blue; and the correlation value calculating step calculates the normalized correlation value as the correlation value.

The three color variables are preferably level values representing hue, value, chroma; and each of the first and second data arrays is a single data array transformed from the level value of the hue and chroma without including the level value of brightness according to the predetermined rule.

According to the present invention, a program for specifying the region in the input image based on the correlation value with the model image with respect to a computer having a function of acquiring the input image and the model image is provided; the image processing program for the computer to execute the input image acquiring means for acquiring the input image made up of a plurality of pixels defined by three color variables in which each color is independent from each other; the determination target region setting means for setting the determination target region having a size equal to the model image acquired in advance with the respect to an entire region or a partial region of the input image acquired in the input image acquiring means; the first data array transformation means for transforming the plurality of predetermined colors of the three color variables defining each pixel contained in the determination target region set in the determination target region setting means to a single first array according to the predetermined rule; and the correlation value calculating means for calculating the correlation value between the first data array transformed in the first data array transformation means, and the single second data array transformed from the plurality of predetermined color variables out of the three color variables defining each pixel configuring the model image according to the predetermined rule.

According to the present invention, a computer readable recording medium recorded with the program for the computer to execute the image processing method is provided.

According to the present invention, two or three predetermined color variables out of three color variables defining each pixel contained in the determination target region is transformed to the single first data array, and the correlation value with the second data array transformed from two or three predetermined color variables out of the three color variables defining each pixel contained in the model according to the same rule is calculated. Thus, an absolute comparison is performed for two or three predetermined color variables out of all three color variables contained in the determination target region instead of the relative comparison. Therefore, the image processing device, the image processing method, the program of the same, and the computer readable recording medium recorded with the program for specifying the region having a high correlation value with the model image at high precision irrespective of the relative relationship of the color distribution in the image are realized.

BRIEF DESCRIPTION OF THE DRAWINGS

FIG. 4 shows a view for explaining the calculation of a normalized correlation value between the first data array and the second data array;

DETAILED DESCRIPTION OF THE PREFERRED EMBODIMENTS

Figure 1:
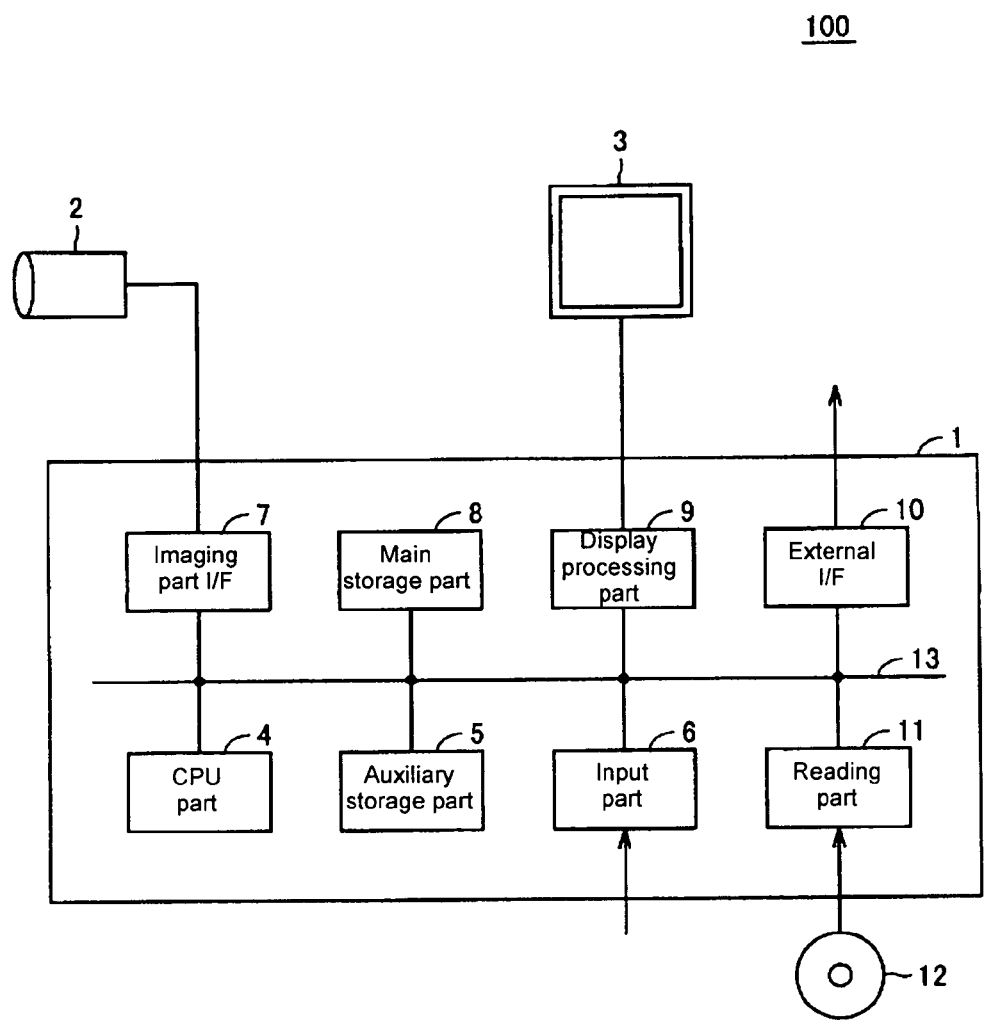
FIG. 1 shows a schematic configuration view of an image sensor device including an image processing device according to an embodiment of the present invention.

The embodiment of the present invention will now be described in detail with reference to the drawings. The same or corresponding components are denoted with the same reference numerals throughout the drawings, and redundant description thereof will not be repeated.

FIG. 1 shows a schematic configuration view of an image sensor device 100 including an image processing device 1 according to the embodiment of the present invention.

With reference to FIG. 1, the image sensor device 100 includes an image processing device 1, an imaging section 2, and a display section 3, where the imaging section 2 images the product continuously conveyed on a manufacturing line and the like, and the image processing device 1 executes the pattern search process on the imaged image, by way of example. The image processing device 1 then displays the process result on the display section 3, and also outputs the process result to other devices (not shown).

The imaging section 2, including an imaging element such as CCD (Coupled Charged Device) or CMOS (Complementary Metal Oxide Semiconductor) sensor and a lens, images the detecting target, and outputs the imaged image to the image processing device 1. The image imaged by the imaging section 2 may be a still image or a moving image.

The display section 3 displays the process result of the image processing device 1, the image imaged by the imaging section 2 and the like to the user. The display section 3 includes a liquid crystal display (LCD: Liquid Crystal Display), a plasma display, an EL (Electro Luminescence) display and the like.

The image processing device 1 includes an imaging part interface (imaging part I/F) 7, a main storage part 8, a display processing part 9, an external interface (external I/F) 10, an auxiliary storage part 5, an input part 6, a reading part 11, a bus 13, and a CPU part 4, and is realized by a personal computer and the like.

The imaging part interface 7 is electrically connected to the imaging section 2, and after receiving the picture signal photographed with the imaging section 2 and acquiring the color information of each pixel by performing a predetermined signal transformation process, outputs the acquired color information to the CPU part 4 via the bus 13. Specifically, the imaging part interface 7 performs frame synchronization on the picture signal received from the imaging section 2, demodulates the color information of each pixel developed and transmitted on the time axis, and acquires the color variable (hereinafter referred to as RGB information) of red, blue, and green for each pixel. In the embodiment of the present invention, the imaging part interface 7 is assumed to output the gray value where red, blue and green of each pixel respectively has 256 tones (0 to 255), by way of example. This holds for the following description.

The main storage part 8 stores a program to be executed on the CPU part 4, the image data imaged by the imaging section 2, the data array of the model image stored in advance, and the image data being image processed in the CPU part 4 and the like. The main storage part 8 includes semiconductor storage element such as DRAM (Dynamic Random Access Memory), SRAM (Static Random Access Memory) and the like.

The display processing part 9 receives the data for displaying the process result in the CPU part 4, the image imaged by the imaging section 2, a screen urging the user to input, a screen showing the processing state of the CPU part 4 and the like; performs a predetermined signal processing, and thereafter; outputs the result to the display section 3 as the picture signal.

The external interface 10 outputs the result of the process and the like executed by the CPU part 4 to the outside. By way of example, the external interface 10 includes a contact point output (DO) configured by photodiode, transistor, relay and the like and a communication means complying with USB (Universal Serial Bus), RS-232C (Recommended Standard 232 version C), IEEE (Institute of Electrical and Electronic Engineers) 1394, SCSI (Small Computer System Interface), internet (registered trademark) and the like.

The auxiliary storage part 5 has a non-volatile storage region, and stores the image imaged by the imaging section 2, the model image acquired in advance, the process result in the CPU part 4 and the like. By way of example, the auxiliary storage part 5 includes a hard disc drive (HDD) and semiconductor memory such as a flash memory card, SD memory card, and IC memory card.

The input part 6 receives setting, instruction and the like from the user and provides the same to the CPU part 4 via the bus 13.

The reading part 11 receives the recording medium 12 recorded with the program to be executed on the CPU part 4, reads the program, and provides the same to the auxiliary storage part 5 or the main storage part 8. The recording medium 12 merely needs to be able to hold data in a non-volatile manner, and may be a removable recording medium such as optical disc (CD(Compact disk), DVD (Digital Versatile Disc)-ROM/RAM/R/RW, MO (Magnetic Optical Disc), MD (Mini Disc)), flexible disk, magnetic tape and the like.

The CPU part 4 receives the RGB information generated from the input image, which is the color image, imaged by the imaging section 2 via the imaging part interface 7, and once stores the information in the main storage part 8 in association with the coordinate of each pixel. The CPU part 4 then sets a determination target region having the size equal to the model image acquired in advance with respect to the input image, and transforms the RGB information defining the pixel contained in the determination target region to a single first data array according to the predetermined rule. Furthermore, the CPU part 4 reads a single second data array transformed from the RGB information defining the pixel configuring the model image stored in the main storage part 8 or the auxiliary storage part 5 in advance according to the predetermined rule, and calculates the normalized correlation value with the transformed first data array.

The CPU part 4 determines whether or not the calculated normalized correlation value exceeds the predetermined threshold value, and if exceeding the threshold value, determines that the relevant set determination target region matches the model image. Furthermore, the CPU part 4 stores the positional information (coordinate) of the determination target region determined as matching the model image in the main storage part 8 or the auxiliary storage part 5.

Similarly, the CPU part 4 sequentially moves the determination target region in the region of the input image, repeatedly executes the transformation of the first data array and the calculation of the normalized correlation value with the second data array in each determination target region, and determines whether or not each determination target region matches the model image. In other words, the CPU part 4 specifies the region that matches the model image out of the determination target regions set in the input image, and stores the coordinate data of the specified region.

Finally, when the movement of the determination target region in the input image is completed, the CPU part 4 displays data such as total number of regions that matches the stored model image, the coordinates of the region that matches the model image and the like on the display section 3 via the display processing part 9. The CPU part 4 may output the data to other devices (not shown) via the external interface 10.

In another configuration, the CPU part 4 once stores the normalized correlation value calculated for every movement of the determination target region in the main storage part 8 or the auxiliary storage part 5 in association with each determination target region, in place of the configuration of comparing the normalized correlation value and the predetermined threshold value for every movement of the determination target region. After the movement of the determination target region in the input image is completed, the CPU part 4 extracts a predetermined number of normalized correlation value in order from the highest number out of the stored normalized correlation values, and specifies the predetermined number of determination target regions associated with the extracted normalized correlation value. Furthermore, the CPU part 4 displays the positional information such as the coordinate and the like of the specified determination target region on the display section 3 via the display processing part 9.

The CPU part 4 receives the RGB information generated from the reference image for extracting the model image via the imaging part interface 7, and once stores the same in the main storage part 8 in association with the coordinate of each pixel. The CPU part 4 then sets a mask region corresponding to an adjustment command of the user from the reference image, and transforms the RGB information defining the pixel contained in the relevant region to a single second data array according to the predetermined rule. The CPU part 4 then stores the transformed second data array in the main storage part 8 or the auxiliary storage part 5.

In the embodiment of the present invention, the imaging part interface 7 realizes "input image acquiring means" and "reference image acquiring means", and the CPU part 4 realizes "determination target region setting means", "first data transformation means", "correlation value calculating means", "determining means" and "second data transformation means".

The processes in the CPU part 4 will now be described in detail.

Overall Process on Input Image

Figure 2:
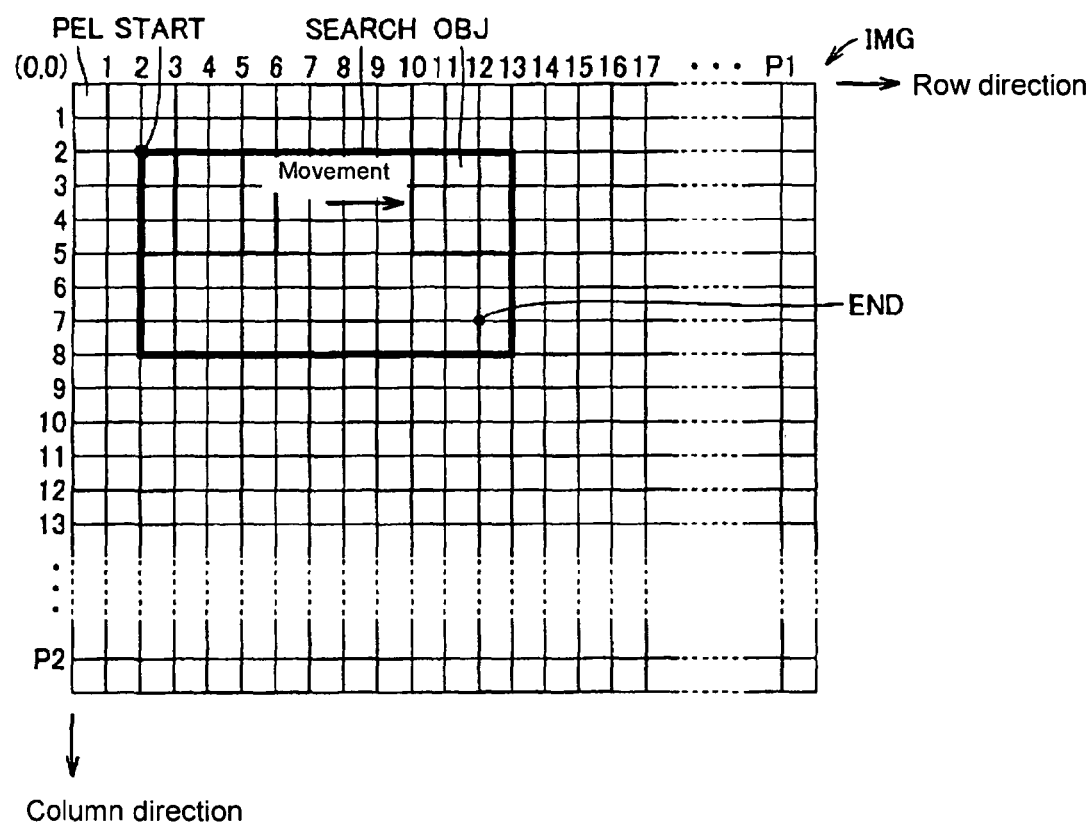
FIG. 2 shows a view for explaining the outline of the process for specifying the region that matches the model image with respect to the input image.

FIG. 2 shows a view for explaining the outline of the process for specifying the region that matches the model image on the input image IMG.

With reference to FIG. 2, the input image IMG imaged in the imaging section 2 is assumed to be configured by a plurality of pixels PEL arranged in a matrix form of (P1+1)×(P2+1) by way of example. The CPU part 4 associates the coordinate of (0, 0) to (P1, P2) on the respective pixel configuring the input image IMG. In FIG. 2, the coordinate of each pixel PEL is indicated by two numerical values in the row direction and the column direction corresponding to the upper left corner of the region of each pixel PEL.

The CPU part 4 displays the input image IMG imaged by the imaging section 2 on the display section 3 via the display processing part 9, and receives the setting of the search region from the user. When the user provides the setting of the search region, the CPU part 4 defines the search region SEARCH corresponding to the setting in association with the input image IMG. The search region SEARCH is indicated with the starting coordinate START and the terminating coordinate END indicated by the coordinate of the input image IMG. When the user does not provide the setting of the search region, the CPU part 4 assumes the entire input image IMG as the search region SEARCH.

Subsequently, the CPU part 4 sets the determination target region OBJ in the set search region SEARCH. The determination target region OBJ has a size (number of pixels) equal to the model image. The CPU part 4 sequentially moves the determination target region OBJ in the search region SEARCH, and determines whether or not the image contained in the determination target region OBJ matches the model image for every movement.

Finally, when determined that the image contained in the determination target region OBJ matches the model image at all the positions to which the determination target region OBJ can move to in the search region SEARCH, the CPU part 4 terminates the process on the relevant input image IMG.

Transformation Process to Single Data Array

The CPU part 4 transforms the RGB information defining the pixel contained in the determination target region OBJ set in the input image IMG to the single first data array according to the predetermined rule, and calculates the normalized correlation value with the single second data array transformed from the model image according to the same predetermined rule.

Figure 3:
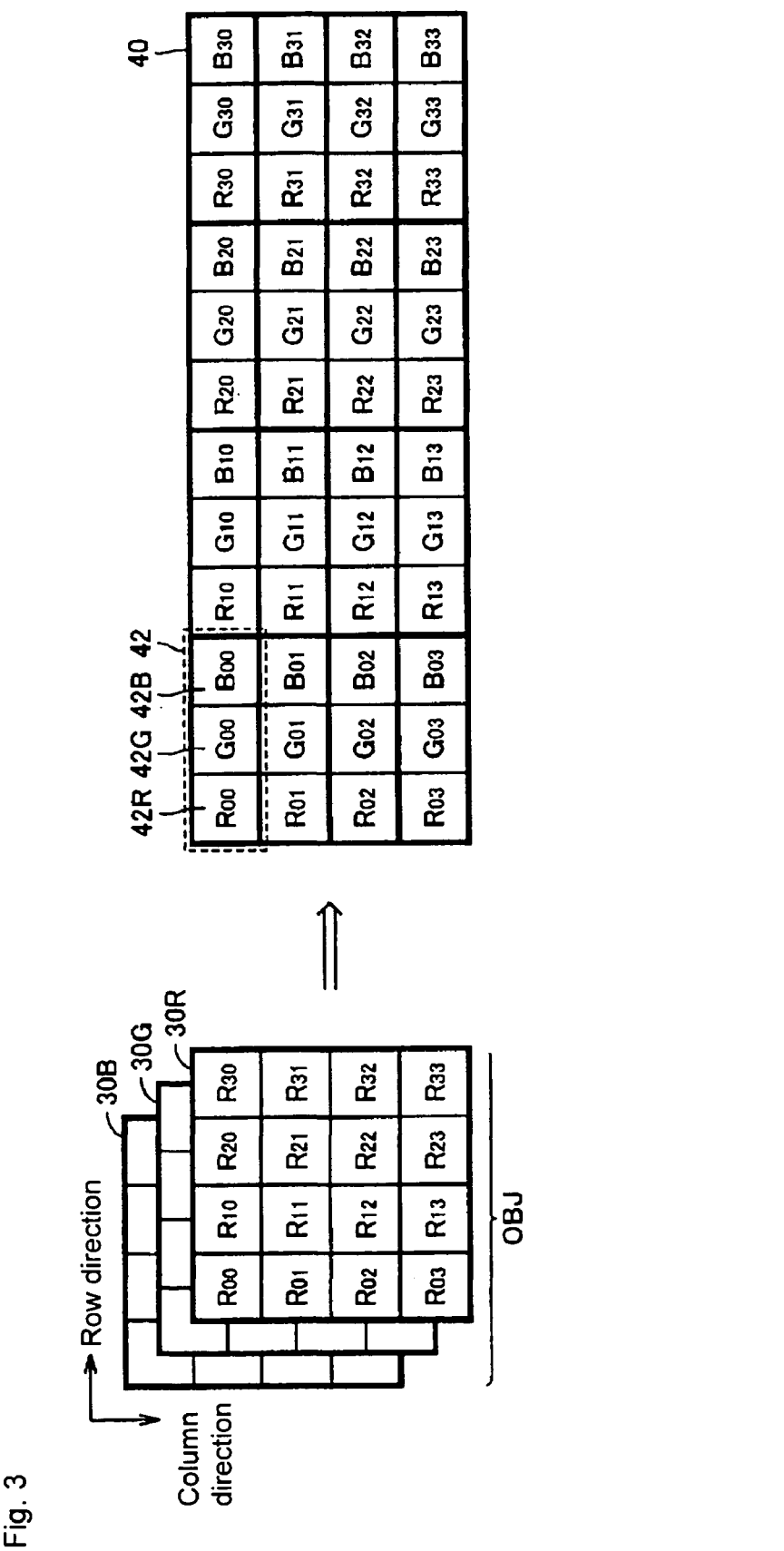
FIG. 3 shows a view for explaining a process of transforming the RGB information of each pixel contained in the determination target region OBJ to a first data array.

FIG. 3 shows a view for explaining the process of transforming the RGB information of each pixel contained in the determination target region OBJ to the first data array.

With reference to FIG. 3, the determination target region OBJ includes a combination of a red gray image 30R, a green gray image 30G, and a blue gray image 30B defining the red gray value, the green gray value, and the blue gray value of each pixel. Assuming the determination target region OBJ is configured by 4×4 pixels, by way of example, the determination target region OBJ can be assumed to be made up of three 4 rows×4 columns gray value matrixes. In association with the pixel position (i, j) ($0 \leq i, j \leq 3$) in the determination target region OBJ, each element is expressed as a red gray value Rij, a green gray value Gij, and a blue gray value Bij. The CPU part 4 transforms each color gray value to the single first data array 40 uniquely associated with the pixel position in the determination target region OBJ.

The first data array 40 in the present embodiment is made up of a plurality of elements 42 (illustrated with frame of broken line in FIG. 3) arranged in matrix form of 4 rows×4 columns in association with the pixel position (i, j) of the determination target region OBJ. Each element 42 is made up of a one-dimensional array of the red gray value 42R, the green gray value 42G, and the blue gray value 42B defining the pixel associated therewith. Therefore, the element 42 corresponding to the pixel position (i, j) of the determination target region OBJ is made of a one-dimensional array of the red gray value Rij, the green gray value Gij, and the blue gray value Bij. As a result, the first data array 40 becomes the gray value matrix of 12 rows×4 columns, which is a two-dimensional array.

The array in each element 42 is not limited thereto, and may be the array in which the array order of the red gray value Rij, the green gray value Gij, and the blue gray value Bij is changed, or the array arranged in the column direction.

Therefore, the CPU part 4 transforms the RGB information contained in the determination target region OBJ to the first data array. Furthermore, the RGB information of each pixel contained in the model image is transformed to the second data array according to the same rule as in the transformation to the first data array.

The CPU part 4 may transform the RGB information of each pixel contained in the model image to the second data array as hereinafter described, or may receive the model image and the second data array transformed from the RGB information thereof from other means (not shown).

Calculation Process of Normalized Correlation Value

When acquiring the first and second data arrays transformed according to the same rule, the CPU part 4 calculates the normalized correlation value with respect to each other.

FIG. 4 shows a view for explaining the calculation of the normalized correlation value between the first data array 40 and the second data array 44.

With reference to FIG. 4, the first data array 40 and the second data array 44 transformed according to the above described process become a two-dimensional array having the same size (number of rows and number of columns) with respect to each other. Assuming each element (gray value) in the first data array 40 and the second data array 44 as X(n, m)

and Y(n, m), (1≦n≦N, 1≦m≦M) to simplify the content of the description, the normalized correlation value C is calculated as in equation (1) with the covariance value of the first data array 40 and the second data array 44 as σXY, the variance of the first data array as σX2, and the variance of the second data array 44 as σY2.

$$\text{Normalized correlation value } C = \frac{\sigma XY}{\sqrt{\sigma X^2} \times \sqrt{\sigma Y^2}} = \quad (1)$$

$$\frac{N \times M \times \sum_{n=1}^{n=N} \sum_{m=1}^{m=M} (X(n,m) \times Y(n,m)) - \left(\sum_{n=1}^{n=N} \sum_{m=1}^{m=M} X(n,m)\right) \times \left(\sum_{n=1}^{n=N} \sum_{m=1}^{m=M} Y(n,m)\right)}{\sqrt{\left\{N \times M \times \sum_{n=1}^{n=N} \sum_{m=1}^{m=M} X(n,m)^2 - \left(\sum_{n=1}^{n=N} \sum_{m=1}^{m=M} X(n,m)\right)^2\right\}} \times \sqrt{\left\{N \times M \times \sum_{n=1}^{n=N} \sum_{m=1}^{m=M} Y(n,m)^2 - \left(\sum_{n=1}^{n=N} \sum_{m=1}^{m=M} Y(n,m)\right)^2\right\}}}$$

With reference to equation (1), the normalized correlation value C is calculated by the sum ΣX(n, m) of the element X(n, m) in the first data array 40 and the sum of squares ΣX(n, m)$^2$ of the element X(n, m); the sum ΣY(n, m) of the element Y(n, m) in the second data array 44 and the sum of squares ΣY(n, m)$^2$ of the element Y(n, m); and the product of the sum Σ(X(n, m)×Y(n, m)) of the two corresponding elements in the first data array 40 and the second data array 44.

The CPU part 4 acquires the sum ΣY(n, m) and the sum of squares ΣY(n, m)$^2$ in advance with respect to the second data array transformed from the RGB information of each pixel contained in the model image. The CPU part 4 calculates the sum ΣX(n, m) and the sum of squares ΣX(n, m)$^2$ with respect to the first data array 40, as well as the product of the sum Σ(X(n, m)×X(n, m)) with respect to the first data array 40 and the second data array 44, and calculates the normalized correlation value C for every setting of the determination target region OBJ.

Referring again to FIGS. 3 and 4, the CPU part 4 transforms the red gray value, the green gray value, and the blue gray value defining each pixel contained in the determination target region OBJ to the first data array 40 as shown in FIG. 3. Therefore, the red gray value Rij, the green gray value Gij, and the blue gray value Bij configuring the first data array 40 are respectively transformed to the element X(n, m) in the first data array 40 according to equation (2) shown below.

$$Rij = X(i \times 3+0, j)$$

$$Gij = X(i \times 3+1, j) \quad (2)$$

$$Bij = X(i \times 3+2, j)$$

On the other hand, the element X (n, m) in the first data array 40 is inverse transformed to the red gray value Rij, the green gray value Gij, and the blue gray value Bij, according to equation (3) shown below.

$$X(n,m) =$$

$$Rkm (\text{when } n=3k+0)$$

$$Gkm (\text{when } n=3k+1) \quad (3)$$

$$Bkm (\text{when } n=3k+2)$$

where, k=0, 1, 2, . . . .

As described above, the CPU part 4 transforms the red gray value, the green gray value, and the blue gray value defining each pixel contained in the determination target region OBJ to the first data array so that its correspondence relationship is uniquely defined, and inverse transformation is possible. Since the second data array 44 is transformed according to the same rule, correspondence relationship is uniquely defined for the red gray value, the green gray value, and the blue gray value defining each pixel contained in the model image and inverse transformation is possible.

Determination Process

The CPU part 4 determines whether or not the determination target region OBJ matches the model image based on the normalized correlation value C calculated according to the above described process.

In equation (1), the "normalized" correlation value is calculated since the square root of the variance, that is, the standard deviation in the first data array and the second data array is contained in the denominator. This means that the normalized correlation value C is standardized within the range of 0≦C≦1, where C=1 when the two data arrays are entirely the same.

A plurality of methods are known for a determining method, but in the embodiment of the invention, determination is made on whether or not the determination target region OBJ matches the model image according to whether the calculated normalized correlation value C exceeds a predetermined threshold value. In other words, the CPU part 4 calculates the normalized correlation value C of the determination target region OBJ and the model image for every setting of the determination target region OBJ on the input image IMG, and compares the calculated normalized correlation value C and the predetermined threshold value. The CPU part 4 determines that the determination target region OBJ matches the model image if the calculated normalized correlation value C exceeds the predetermined threshold value.

In another aspect, the CPU part 4 calculates the normalized correlation value C between the determination target region OBJ and the model image for every setting of the determination target region OBJ on the input image IMG, and determines that a predetermined number of determination target regions OBJ matches the model image from the predetermined number from the high order, that is, in order from highest value out of the calculated normalized correlation values C.

Processing Flowchart

Figure 5:
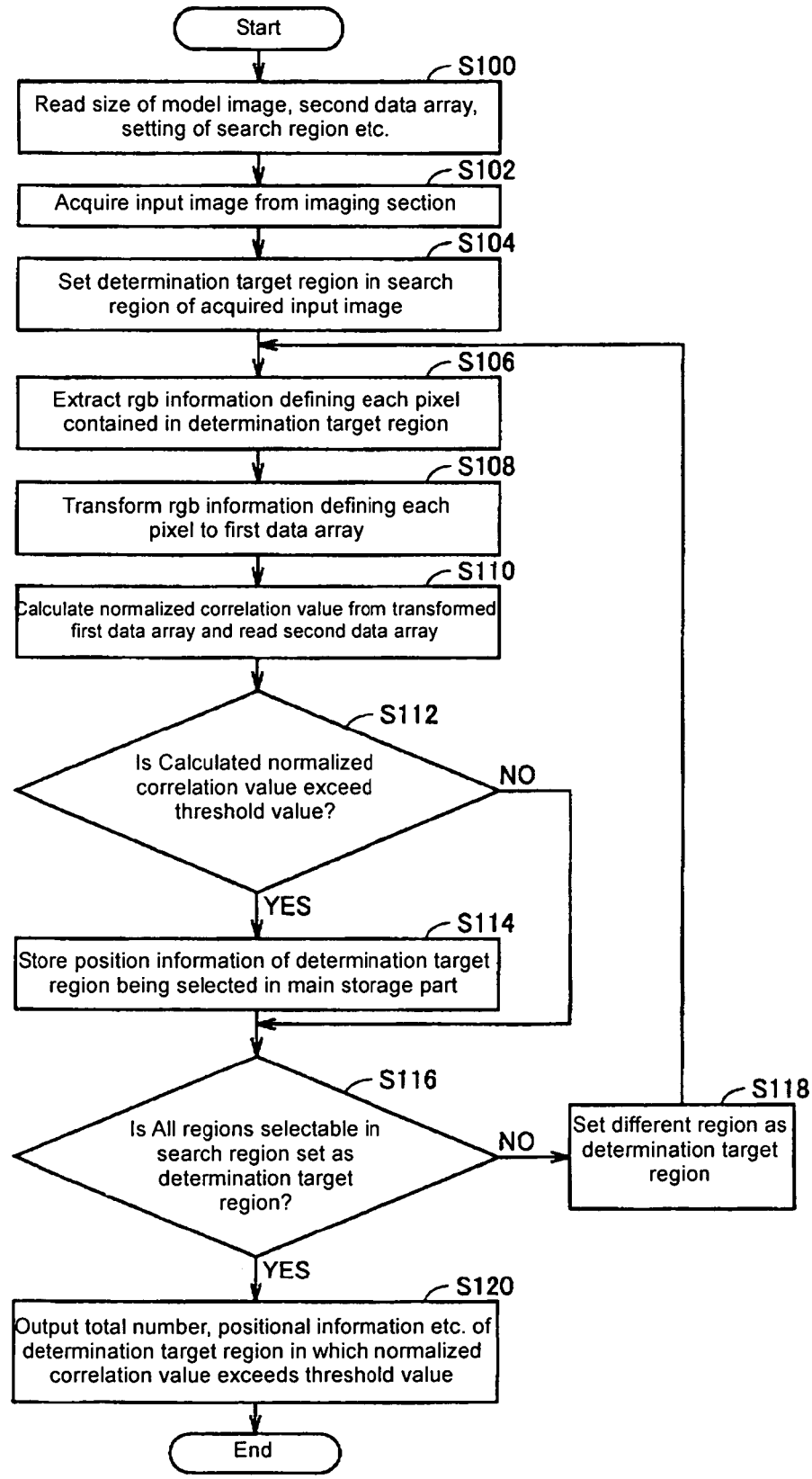
FIG. 5 shows a flow chart illustrating the process in the CPU part.

FIG. 5 shows a flow chart illustrating the process in the CPU part 4.

With reference to FIG. 5, the CPU part 4 reads the size (number of pixels) of the model image, the second data array, and the setting of the search region SEARCH etc. set in advance from the main storage part 8 or the auxiliary storage part 5 (step S100). The second data array contains the sum and the sum of squares for the elements of the second data array in addition to the data array itself.

The CPU part 4 acquires the input image IMG from the imaging section 2 via the imaging part interface 7 (step S102).

The CPU part 4 sets the determination target region OBJ in the search region SEARCH of the acquired input image IMG (step S104), and further extracts the RGB information defining each pixel contained in the set determination target region OBJ (step S106). The CPU part 4 then transforms the extracted RGB information defining each pixel to the first data array (step S108). Moreover, the CPU part 4 calculates the normalized correlation value C from the transformed first data array and the read second data array (step S110). Specifically, the CPU part 4 sequentially scans each element of the first data array, and calculates the normalized correlation value according to equation (1) after calculating the sum and the sum of squares for the elements of the first data array, as well as the sum of the product of each element of the first data array and the second data array.

Thereafter, the CPU part 4 determines whether or not the calculated normalized correlation value C exceeds the threshold value (step S112). When the normalized correlation value C exceeds the threshold value (YES in step S112), the positional information (coordinate) of the determination target region OBJ being selected is stored in the main storage part 8 (step S114).

When the normalized correlation value C does not exceed the threshold value (NO in step S112), or after the positional information of the determination target region OBJ being selected is stored in the main storage part 8 (step S114), the CPU part 4 determines whether or not all the regions selectable in the search region SEARCH are set as the determination target region OBJ (step S116). When all the regions are not selected as the determination target region OBJ (NO in step S116), the CPU part 4 sets a different region as the determination target region OBJ (step S118). The CPU part 4 repeatedly executes steps S106 to S114 until the determination result is YES in step S116.

When all the regions are selected as the determination target region OBJ (YES in step S116), the CPU part 4 outputs the total number and the positional information of the determination target region OBJ in which the normalized correlation value C exceeds the threshold value stored in the main storage part 8 to the display part 3 and the like (step S120). The CPU part 4 then terminates the processes.

Applications

FIG. 6 is an application of the determination process by the image processing device 1 according to the embodiment of the present invention.

Figure 6A:
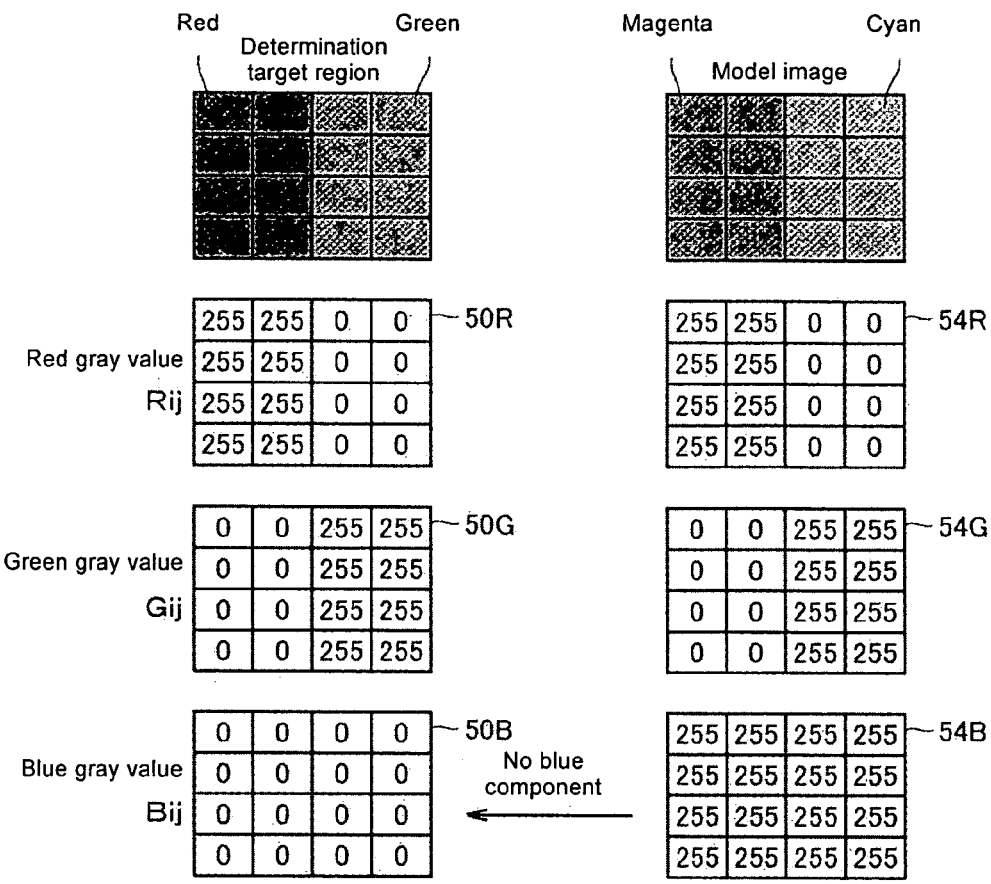
FIGS. 6A and 6B show applications of the determination process by the image processing device according to the embodiment of the present invention.

FIG. 6A shows one example of the determination target region OBJ and the model image.

Figure 6B:
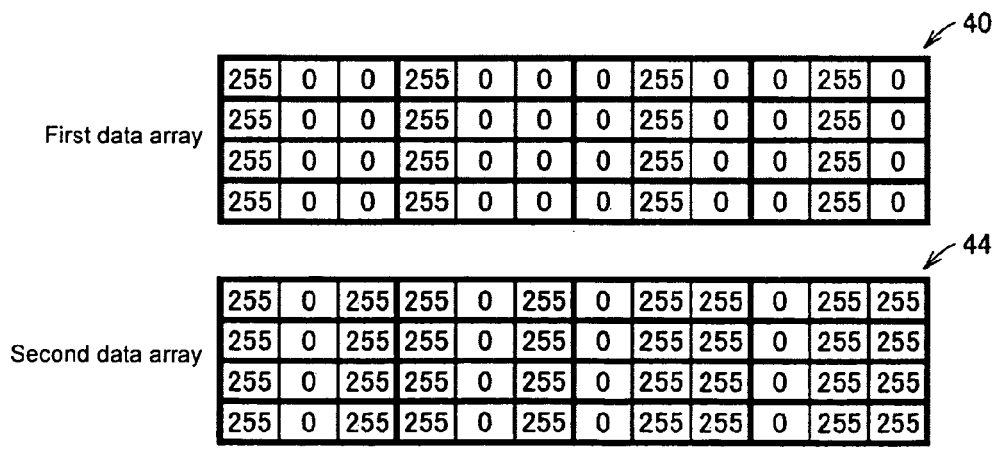

FIG. 6B shows the first and second data array transformed from the RGB information of the determination target region OBJ and the model image shown in FIG. 6A.

With reference to FIG. 6A, both the model image and the image set in the determination target region OBJ are assumed to be made up of 4×4 pixels by way of example. The model image has a pattern colored with two colors of "magenta" and "cyan" of 2×4 pixels each, and the image set in the determination target region OBJ has the same pattern as the model image and has two colors of "red" and "green" generated by equally removing the "blue component" from the model image.

In other words, comparing the red concentration image 50R, the green concentration image 50G, and the blue concentration image 50B obtained by decomposing the image set in the determination target region OBJ to each color component, and the red concentration image 54R, the green concentration image 54G, and the blue concentration image 54B obtained by decomposing the model image to each color component, respectively, the red concentration components 50R, 54R and the green concentration components 50G match. Furthermore, the blue concentration images 50B, 54B have a concentration difference of "255" in all the pixels.

With reference to FIG. 6B, the normalized correlation value C between the first data array 40 transformed from the image set in the determination target region OBJ and the second data array 44 transformed from the RGB information of the model image is calculated according to equation (1), where C=0.5. This means that the extent of matching of the image set in the determination target region OBJ and the model image is only 50%. Thus, the erroneous determination is reliably avoided by setting the threshold value to about 80%.

Therefore, the image processing device according to the embodiment of the present invention is able to perform, with satisfactory precision, the determination on matching even with respect to the image that may be erroneously determined in the conventional method using the color difference.

Variant 1

The data configuration of the first and second data arrays obtained by transforming the RGB information is not limited to the above, and various aspects may be used.

Figure 7:
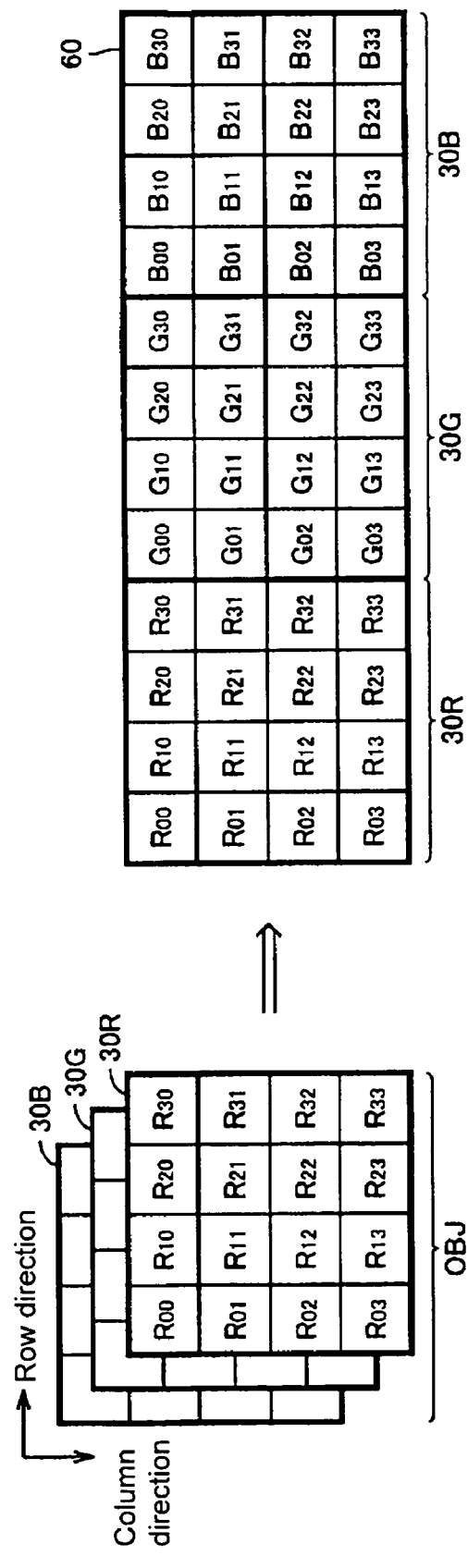
FIG. 7 shows a view for explaining the transformation process to the first data array according to variant 1 of the embodiment of the present invention.

FIG. 7 shows a view for explaining the transformation process to the first data array according to variant 1 of the embodiment of the present invention.

With reference to FIG. 7, assuming the determination target region OBJ is configured by 4×4 pixels, each element is defined as the red gray value Rij, the green gray value Gij, and the blue gray value Bij in association with the pixel position (i, j) ($0 \leq i$, $j \leq 3$) in the determination target region OBJ, similar to FIG. 3.

The first data array 60 according to variant 1 of the embodiment of the present embodiment is a two-dimensional array, and is configured with the red gray image 30R, the green gray image 30G, and the blue gray image 30B defining the determination target region OBJ arranged juxtaposed in the row direction. The red gray image 30R, the green gray image 30G, and the blue gray image 30B are respectively configured by 4×4 pixels, and thus the first data array 60 has a gray value matrix of 12 rows×4 columns.

Therefore, in the variant 1 of the embodiment of the present invention as well, the RGB information defining each pixel of the determination target region OBJ is transformed to a single first data array 60 uniquely associated with the relevant pixel position in the determination target region OBJ.

The second data array transformed from the RGB information of the pixels configuring the model image obviously has the same array configuration as the first data array 60 described above.

The normalized correlation value C can be calculated by similarly applying equation (1) on the first and second data arrays according to variant 1 of the embodiment of the present invention, and thus the detailed description will not be repeated.

The arrangement form of the red gray image 30R, the green gray image 30G and the blue gray image 30B in the first data array 60 is not limited thereto, and may take a form in which the order of arrangement is changed or may take a form in which the gray images are arranged juxtaposed in the column direction.

As described above, since the data array is generated by combining the red gray image, the green gray image, and the blue gray image configuring one image, transformation to the data array is facilitated by using the picture signal from each CCD if the imaging section including three CCDs for acquiring the gray value for each color is used.

Variant 2

The configuration using the first and second data arrays of two-dimensional arrays have been explained in the embodiment and variant 1 thereof of the present invention, but a configuration of one-dimensional array may be adopted.

Figure 8:
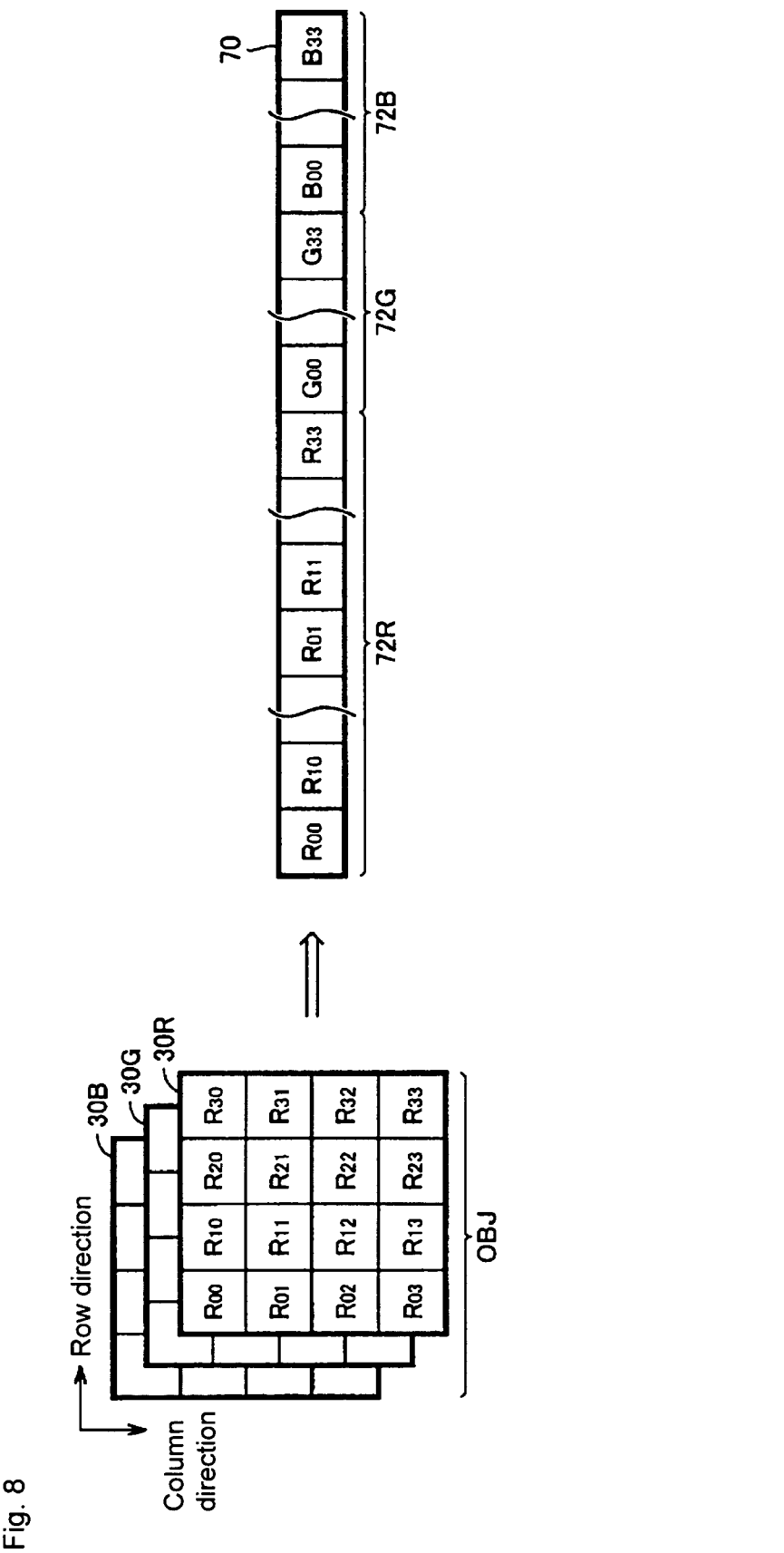
FIG. 8 shows a view for explaining the transformation process to the first data array according to variant 2 of the embodiment of the present invention.

FIG. 8 shows a view for explaining the transformation process to the first data array 70 according to variant 2 of the embodiment of the present invention.

With reference to FIG. 8, assuming the determination target region OBJ is configured by 4×4 pixels, each element is defined with the red gray value Rij, the green gray value Gij, and the blue gray value Bij, in association with the pixel position (i, j) ($0 \leq i, j \leq 3$) in the determination target region OBJ, similar to FIG. 3.

The first data array 70 according to variant 2 of the embodiment of the present invention is a one-dimensional array in which the red gray value Rij, the green gray value Gij, and the blue gray value Bij are developed in the row direction and continuously arranged for each of the red gray image 30R, the green gray image 30G, and the blue gray image 30B. In other words, the first data array 70 is configured with the red gray value array 72R, the green gray value array 72G, and the blue gray value array 72B juxtaposed in the same direction. The red gray value array 72R is configured as R00, R10, . . . , R01, R11, . . . , R33 in which the red gray values Rij configuring the red gray image 30R are continuously arranged along the row direction. The green gray value array 72G and the blue gray value array 72B are configured similar to the red gray value array 72R.

Each of the red gray image 30R, the green gray image 30G, and the blue gray image 30B is configured by 4×4 pixels (16 pixels), and thus the first data array 70 becomes a one-dimensional array including 48 gray values.

Therefore, in variant 2 of the embodiment of the present invention as well, the RGB information defining each pixel of the determination target region OBJ is transformed to a single first data array 70 uniquely associated with the relevant pixel position in the determination target region OBJ.

The second data array transformed from the RGB information of the pixels configuring the model image obviously has the same array configuration same as the first data array 70 described above.

The arrangement form of the red gray value Rij, the green gray value Gij, and the blue gray value Bij in the first data array 70 is not limited thereto, and the red gray value Rij, the green gray value Gij, and the blue gray value Bij may be continuously arranged for each pixel.

Since the first and second data arrays according to variant 2 of the embodiment of the present invention are one-dimensional array, the normalized correlation value C can be calculated from an equation simpler than the equation (1). Assuming each gray value of the first data array according to variant 2 of the embodiment of the present invention is X(1) and each gray value of the second data array is Y(1) ($1 \leq l \leq L$), the normalized correlation value C is calculated from equation (4).

$$\text{Normalized correlation value } C = \frac{L \times \sum_{l=1}^{l=L}(X(l) \times Y(l)) - \sum_{l=1}^{l=L}X(l) \times \sum_{l=1}^{l=L}Y(l)}{\sqrt{L \times \sum_{l=1}^{l=L}X(l)^2 - \left(\sum_{l=1}^{l=L}X(l)\right)^2} \times \sqrt{L \times \sum_{l=1}^{l=L}Y(l)^2 - \left(\sum_{l=1}^{l=L}Y(l)\right)^2}} \quad (4)$$

With reference to equation (4), equation (4) is a more simplified form to allow equation (1) to be applied to the one-dimensional array.

The calculation speed increases since the processes in the calculation process of the normalized correlation value are more simplified when transforming to the one-dimensional data array, as described above.

Model Image Acquiring Process

The image processing device 1 according to the embodiment of the present invention further has a function of acquiring the reference image and acquiring the model image from the reference image.

Figure 9:
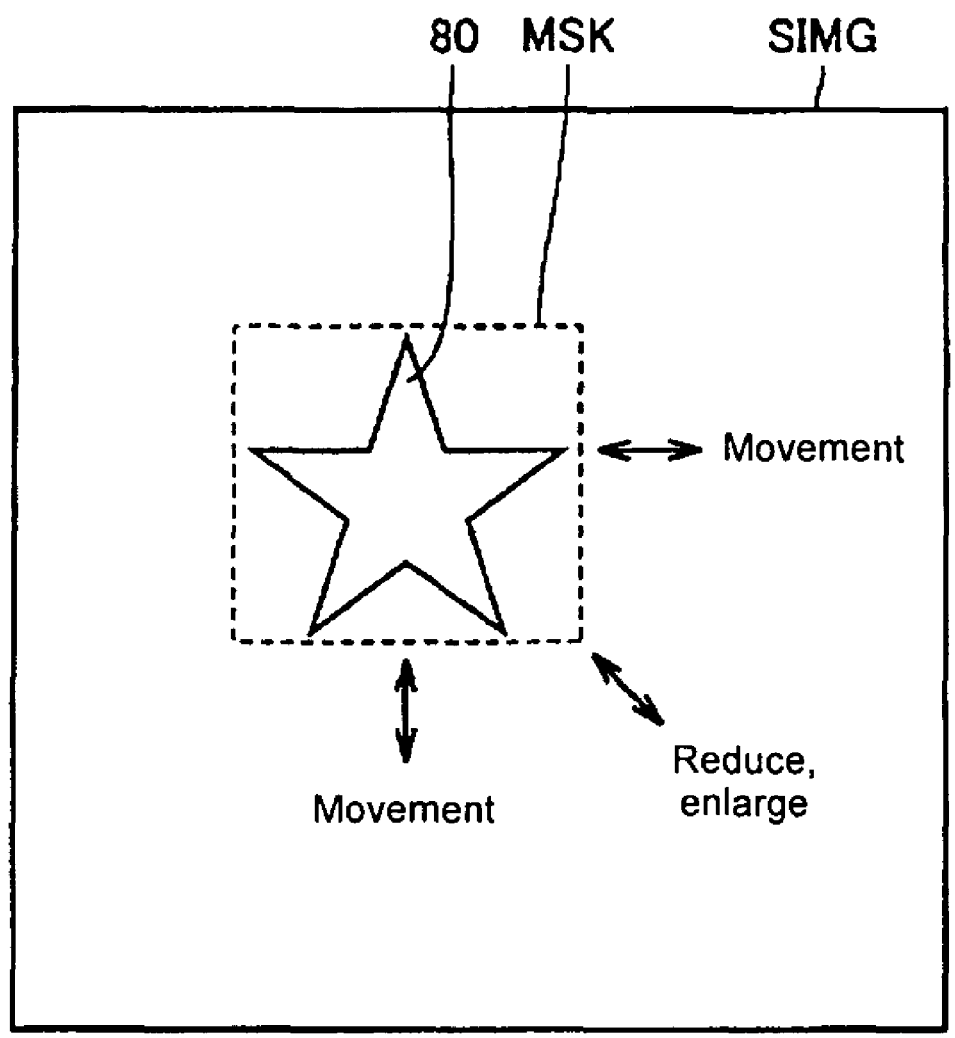
FIG. 9 shows a view for explaining the function of acquiring the model image.

FIG. 9 shows a view for explaining the function of acquiring the model image.

With reference to FIGS. 1 and 9, the user arranges the product sample and the like in the photographing range of the imaging section 2, for example, to extract the model image. When the user provides a photograph start command via the input part 6, the CPU part 4 acquires the image from the imaging section 2 in response to the photograph start command, and displays the same as the reference image SIMG via the display section 3. Simultaneously, the CPU part 4 displays the mask region MSK for extracting the model image from the reference image SIMG. The CPU part 4 displays the mask region MSK of a size (default size) defined in advance as the initial value. Furthermore, the user provides an adjustment command for the position, the size etc. of the mask region MSK via the input part 6 so as to surround the desired image 80 with reference to the reference image SIMG displayed on the display section 3. The CPU part 4 then changes the position and the size of the mask region MSK displayed on the display section 3 in response to the adjustment command.

When the setting of the mask region MSK is completed, the user provides a determination command via the input part 6. The CPU part 4 then acquires information of the image contained in the range of the mask region MSK in response to the determination command. Specifically, the CPU part 4 stores the image size of the mask region MSK and the RGB information of each pixel contained in the range of the mask region MSK in the main storage part 8.

The CPU part 4 transforms the RGB information of each pixel stored in the main storage part 8 to the second data array according to the same rule as the transformation to the first data array, and stores the transformed second data array in the main storage area 8. The transformation to the second data array is the same as the transformation to the first data array described above, and thus the detailed description thereof will not be repeated. Simultaneously, the CPU part 4 calculates the sum and the sum of squares for the elements in the second data array, and stores the same in the main storage part 8.

Figure 10:
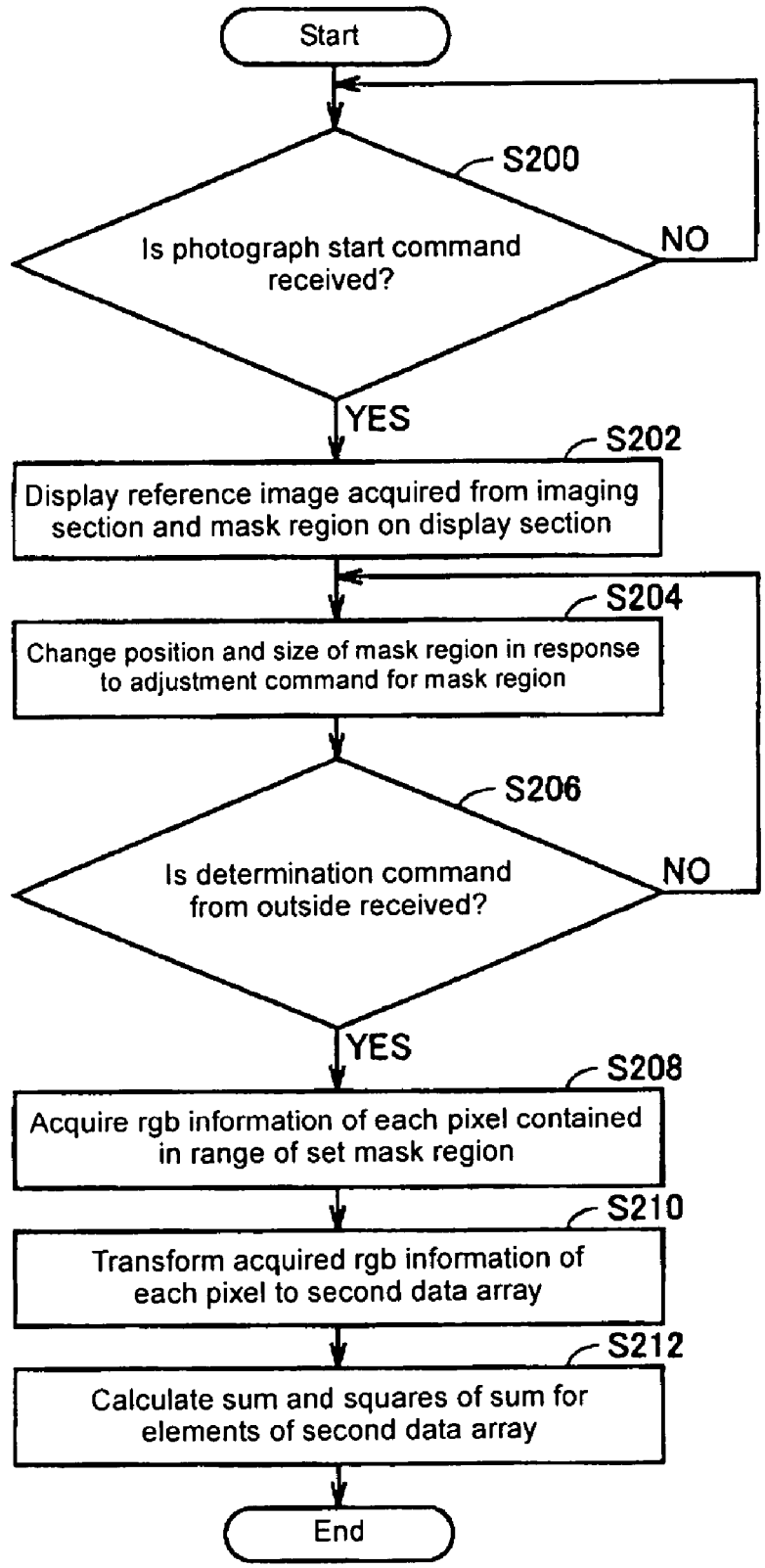
FIG. 10 shows a flow chart for extracting the model image in the CPU part.

FIG. 10 shows a flow chart for extracting the model image in the CPU part 4.

With reference to FIG. 10, the CPU part 4 determines whether or not the photograph start command has been received from the outside (step 200). The user arranges the reference object for extracting the model image in the photographing range of the imaging section 2, and provides the photograph start command via the input part 6.

When the photograph start command is not received (NO in step 200), the CPU part 4 waits until the photograph start command is received (step 200).

When the photograph start command is received, the CPU part 4 displays the reference image SIMG acquired from the imaging section 2 and the mask region MSK on the display section 3 (step S202). The CPU part 4 then changes the position and the size of the mask region MSK in response to the adjustment command for the mask region MSK (step S204).

Furthermore, the CPU part 4 determines whether or not the determination command is received from the outside (step S206). When the determination command is not received (NO in step S206), the CPU part 4 repeats steps S204 and 206.

When the determination command is received (YES in step S206), the CPU part 4 acquires the RGB information of each pixel contained in the range of the set mask region MSK (step S208). The CPU part 4 then transforms the acquired RGB information of each pixel to the second data array (step S210), and further calculates the sum and the sum of squares for the elements in the second data array (step S212) and stores the same in the main storage part 8. The CPU part 4 then terminates the process.

The CPU part 4 acquires the model image from the reference image SIMG, as described above.

The configuration of acquiring the model image from the reference image SIMG has been described in the embodiment of the present invention, but a configuration of acquiring the data, that is, the size of the model image, the second data array, the sum and the sum of squares for the second data array etc. related to the model image from other devices (not shown) may be adopted.

The configuration of determining the existence of matching using the normalized correlation value has been described in the description for the embodiment of the present invention, but the correlation value in which the correlation value is normalized does not necessarily need to be used. In other words, determination may be made based on the value of the term of the numerator excluding the term of the denominator in the mathematical equation shown in equation (1).

The configuration of acquiring the color image from the imaging section 2 has been described in the description for the embodiment of the present invention, but the configuration is not limited thereto. For example, the color image stored in advance in the main storage part 8, the auxiliary storage part 5, the recording medium 12 and the like may be acquired and similar process may be performed.

The configuration of using the RGB information made up of "red", "green", and "blue" based on the three primary colors of light as the color information has been described in the description on the embodiment of the present invention, but the configuration is not limited thereto, and the CMY information made up of "cyan", "magenta", and "yellow" which are complementary colors of the three primary colors of light may be used. Furthermore, application is similarly possible using the three color variants of "hue", "value", and "chroma" based on the attributes of the color. In this case, the first and second data arrays may be configured using the information made up of the hue and chroma, other than the value. By excluding the value, the correlation process excluding the influence of the variation in brightness of the input image and the difference in brightness from the model image becomes possible.

Two color variables may be used for the first and second data arrays instead of using all three color variables.

In the description for the embodiment of the present invention described above, a plurality of predetermined color variables out of the three color variables defining each pixel contained in the determination target region having the size same as the model image is transformed to the first data array, and a plurality of predetermined color variables out of the three color variables defining each pixel of the model image is transformed to the second data array, and thereafter, the correlation value of the data arrays is calculated, but in place thereof, the predetermined color variables of the pixel of the determination target region may be read so as to configure the first data array and applied to one of the data arrays in the normalized correlation (apply to X(n, m) in equation (1), X(l) in equation (4)), and the predetermined color variables of the pixel of the model image may be read so as to configure the second data array and applied to the other data array in the normalized correlation (apply to Y(n, m) in equation (1), Y(l) in equation (4)), without generating the first data array and the second data array in the intermediate process.

According to the embodiment of the present invention, the RGB information defining each pixel contained in the determination target region is transformed to a single first data array, and the normalized correlation value with the single second data array transformed from the RGB information defining each pixel contained in the model image according to the same rule is calculated. Thus, an absolute comparison is performed for all the RGB information contained in the determination target region in place of the relative comparison as in the method using color difference. Therefore, the specification of the region that matches the model image is achieved at high precision irrespective of the relative relationship of the color distribution in the determination target region.

According to the embodiment of the present invention, the range of the correlation value is a value between 0 and 1 irrespective of the type of determination target region since the normalized correlation value is used, and the influence of the variation in brightness of the input image and the difference in brightness from the model image is eliminated. Thus, the determination on matching is realized based on whether or not the correlation value exceeds a threshold value set in advance since the extent of matching of the determination target region is compared at the same reference.

The embodiments disclosed herein are merely illustrative and should not be construed as exclusive. The scope of the present invention is as described in the Claims and not in the above description, and encompasses all modifications equivalent to the Claims and within the scope of the Claims.

What is claimed is:

1. An image processing device for specifying a region in an input image based on a correlation value with a model image; the image processing device comprising:
   an input image acquiring device for acquiring the input image made up of a plurality of pixels defined by three color variables in which each color is independent from each other;
   a determination target region setting device for setting a determination target region having a size equal to the model image acquired in advance with the respect to an entire region or a partial region of the input image acquired in the input image acquiring device;
   a first data array transformation device for transforming the plurality of predetermined color variables of the three color variables defining each pixel contained in the determination target region set in the determination target region setting device to a single first data array according to a predetermined rule; and
   a correlation value calculating device for calculating the correlation value between the first data array transformed in the first data array transformation device, and a single second data array transformed from the plurality of predetermined color variables out of the three color variables defining each pixel configuring the model image according to the predetermined rule.

2. The image processing device according to claim 1, wherein the first and second data arrays are single data arrays transformed from the three color variables according the predetermined rule.

3. The image processing device according to claim 2, further comprising:
   a reference image acquiring device for acquiring a reference image for extracting the model image;
   a model image acquiring device for extracting an image of the region corresponding to a command from the outside from the reference image acquired in the reference image acquiring device, and acquiring the extracted image as the model image; and a second data array transformation device for transforming the three color variables defining each pixel configuring the model image acquired in the model image acquiring device to the second data array according to the predetermined rule.

4. The image processing device according to claim 2, wherein each of the first and second data arrays is a two-dimensional array made up of a plurality elements arranged in a matrix form in association with the position of the pixel; and each of the plurality of elements contains a one-dimensional array of the three color variables defining the pixel associated with the element.

5. The image processing device according to claim 2, wherein each of the first and second arrays includes three two-dimensional arrays arranged in a matrix form with one color variable out of three color variables defining each pixel associated with the position of the pixel with respect to each of the three color variables; and the three two-dimensional arrays are arranged in order along the same direction and configure a single data array.

6. The image processing device according to claim 2, wherein each of the first and second data arrays includes three one-dimensional arrays in which one color variable out of the three color variables defining each pixel is continuously arranged with respect to each of the three color variables; and the three one-dimensional arrays are arranged in order in the same direction and configure a single data array.

7. The image processing device according to claim 2, wherein the determination target region setting device sequentially moves the determination target region in the region of the input image, and repeatedly executes the processes in the first data array transformation device and the correlation value calculating device for every movement of the determination target region; and the image processing device further comprises:

a determining device for specifying the determination target region having high correlation value with the model image based on a comparison between the correlation value calculated for every movement of the determination target region and a predetermined threshold value, and outputting the total number of specified determination target region and/or each position of the specified determination target regions when the movement of the determination target region is completed in the determination target region setting device.

8. The image processing device according to claim 2, wherein the determination target region setting device sequentially moves the determination target region in the region of the input image, and repeatedly executes the processes in the first data array transformation device and the correlation value calculating device for every movement of the determination target region; and the image processing device further comprises:

a determining device for extracting the predetermined number of correlation values in order from highest value out of the correlation values calculated for every movement of the determination target region and specifying the determination target region corresponding to the extracted correlation value when the movement of the determination target region is completed in the determination target region setting device, and outputting each position of the specified determination target region.

9. The image processing device according to claim 2, wherein the three color variables are gray values of red, green, and blue; and the correlation value calculating device calculates a normalized correlation value as correlation value.

10. The image processing device according to claim 1, wherein the three color variables are level values representing hue, value, chroma; and each of the first and second data arrays is a single data array transformed from the level value of the hue and chroma without including the level value of brightness according to the predetermined rule.

11. An image processing method for specifying a region in an input image based on a correlation value with a model image, the image processing method comprising:

an input image acquiring step using an input image acquiring device for acquiring the input image made up of a plurality of pixels defined by three color variables in which each color is independent from each other;

a determination target region setting step for setting a determination target region having a size equal to the model image acquired in advance with the respect to an entire region or a partial region of the input image acquired in the input image acquiring step; and a correlation value calculating step for calculating the correlation value between a first data array and a second data array, the plurality of predetermined colors of the three color variables defining each pixel contained in the determination target region set in the determination target region setting step being a single first data array according to a predetermined rule, and the plurality of predetermined color variables out of the three color variables defining each pixel configuring the model image being a single second data array according to the predetermined rule.

12. The image processing method according to claim 11, wherein the three color variables are level values representing hue, value, chroma; and each of the first and second data arrays is a single data array transformed from the level value of the hue and chroma without including the level value of brightness according to the predetermined rule.

13. An image processing method for specifying a region in an input image based on a correlation value with a model image, the image processing method comprising:

an input image acquiring step using an input image acquiring device for acquiring the input image made up of a plurality of pixels defined by three color variables in which each color is independent from each other;

a determination target region setting step for setting a determination target region having a size equal to the model image acquired in advance with the respect to an entire region or a partial region of the input image acquired in the input image acquiring step;

a first data array transformation step for transforming the plurality of predetermined colors of the three color variables defining each pixel contained in the determination target region set in the determination target region setting step to a single first array according to a predetermined rule; and a correlation value calculating step for calculating the correlation value between the first data array transformed in the first data array transformation step, and a single second data array transformed from the plurality of predetermined color variables out of the three color variables defining each pixel configuring the model image according to the predetermined rule.

14. The image processing method according to claim 13, wherein the first and second data arrays are single data arrays transformed from the three color variables according the predetermined rule.

15. The image processing method according to claim 14, further comprising:
a reference image acquiring step for acquiring a reference image for extracting the model image;
a model image acquiring step for extracting an image of the region corresponding to a command from the outside from the reference image acquired in the reference image acquiring step, and acquiring the extracted image as the model image; and
a second data array transformation step for transforming the three color variables defining each pixel configuring the model image acquired in the model image acquiring step to the second data array according to the predetermined rule.

16. The image processing method according to claim 14, wherein each of the first and second data arrays is a two-dimensional array made up of a plurality elements arranged in a matrix form in association with the position of the pixel; and
each of the plurality of elements contains a one-dimensional array of the three color variables defining the pixel associated with the element.

17. The image processing method according to claim 14, wherein each of the first and second arrays includes three two-dimensional arrays arranged in a matrix form with one color variable out of three color variables defining each pixel associated with the position of the pixel with respect to each of the three color variables; and
the three two-dimensional arrays are arranged in order along the same direction and configure a single data array.

18. The image processing method according to claim 14, wherein each of the first and second data arrays includes three one-dimensional arrays in which one color variable out of the three color variables defining each pixel is continuously arranged with respect to each of the three color variables; and
the three one-dimensional arrays are arranged in order in the same direction and configure a single data array.

19. The image processing method according to claim 14, wherein the determination target region setting step sequentially moves the determination target region in the region of the input image, and repeatedly executes the processes in the first data array transformation step and the correlation value calculating step for every movement of the determination target region; and the image processing method further comprises:
a determining step for specifying the determination target region having high correlation value with the model image based on a comparison between the correlation value calculated for every movement of the determination target region and a predetermined threshold value, and outputting each position of the specified determination target region when the movement of the determination target region is completed in the determination target region setting step.

20. The image processing method according to claim 14, wherein the determination target region setting step sequentially moves the determination target region in the region of the input image, and repeatedly executes the processes in the first data array transformation step and the correlation value calculating step for every movement of the determination target region; and the image processing method further comprises:
a determining step for extracting the predetermined number of correlation values in order from highest value out of the correlation values calculated for every movement of the determination target region and specifying the determination target region corresponding to the extracted correlation value when the movement of the determination target region is completed in the determination target region setting step, and outputting the total number of specified determination target region and/or each position of the specified determination target region.

21. The image processing method according to claim 14, wherein the three color variables are gray values of red, green, and blue; and
the correlation value calculating step calculates a normalized correlation value as correlation value.

22. A computer readable medium having a program for specifying a region in an input image based on a correlation value with a model image, the image processing program executed by a computer comprising:
an input image acquiring step for acquiring the input image made up of a plurality of pixels defined by three color variables in which each color is independent from each other;
a determination target region setting step for setting a determination target region having a size equal to the model image acquired in advance with the respect to an entire region or a partial region of the input image acquired in the input image acquiring step;
a first data array transformation step for transforming the plurality of predetermined colors of the three color variables defining each pixel contained in the determination target region set in the determination target region setting step to a single first array according to a predetermined rule; and
a correlation value calculating step for calculating the correlation value between the first data array transformed in the first data array transformation step, and a single second data array transformed from the plurality of predetermined color variables out of the three color variables defining each pixel configuring the model image according to the predetermined rule.

* * * * *